Sept. 8, 1970  F. N. RHINES ET AL  3,527,948

COBALT-RHENIUM ENERGY SOURCE

Filed Dec. 10, 1968

INVENTOR.
Frederick N. Rhines
James A. Donovan
William R. McDonell

BY

ATTORNEY

United States Patent Office 3,527,948
Patented Sept. 8, 1970

3,527,948
COBALT-RHENIUM ENERGY SOURCE
Frederick N. Rhines, Gainesville, Fla., and James A. Donovan and William R. McDonell, Aiken, S.C., assignors to the United States of America as represented by the United States Atomic Energy Commission
Filed Dec. 10, 1968, Ser. No. 782,577
Int. Cl. G21h 3/00
U.S. Cl. 250—106     8 Claims

ABSTRACT OF THE DISCLOSURE

A high temperature cobalt-rhenium radioactive energy source prepared by placing alternate layers of porous rhenium and radioactive cobalt metal into a capsule and heating the capsule and layers above the melting point of cobalt to infuse the molten cobalt into the rhenium layers without substantial diffusion of the cobalt into the capsule walls.

BACKGROUND OF THE INVENTION

The invention described herein was made in the course of or under contract AT(07–2)–1 with the U.S. Atomic Energy Commission.

FIELD OF THE INVENTION

This invention relates generally to radioisotopic energy sources for producing radiation and heat. Such sources are used, for instance, to drive thermionic or thermoelectric devices to provide electric currents over long periods of time without recharging or refueling. It is desirable from the standpoint of thermodynamic efficiency to operate these devices at elevated temperatures. Temperatures in excess of about 1500° C. have been found to be suitable.

DESCRIPTION OF PRIOR ART

Cobalt-60 is a known fuel for a radioactive energy source. It is both a beta and a gamma emitter having a half life of 5.3 years and a power output of 17.4 watts per gram of pure cobalt-60. An isotopic mixture of cobalt-60 and cobalt-59 is readily prepared by irradiating cobalt-59 with neutrons from a nuclear reactor or other neutron source. Such isotopic mixtures have been prepared with an activity of up to about 700 curies per gram and a power output of up to about 10 watts per gram.

Because cobalt-60 is a source of gamma radiation, it can produce harmful physiological effects. It is therefore essential that this radioisotope be carefully contained and adequately shielded. Employment of the isotope in powdered form is avoided because of the likelihood of accidental escape with resulting radiation danger. Containment at elevated temperatures necessary for efficient operation of thermal to electric converters has been found to be difficult due to the volatility (atmospheric boiling point of 2900° C.) and low melting point (1495° C.) of metallic cobalt. Molten cobalt readily penetrates into many if the possible high temperature container materials and can thereafter diffuse from the container walls to contaminate the enviromnent surrounding the energy source. Furthermore, cobalt penetration can structurally weaken the container materials and possibly form alloys having solidus temperatures below that of the molten cobalt. It therefore is desirable to maintain radioactive cobalt in solid form to facilitate containment.

Known cobalt-rhenium alloys have melting points substantially above the melting point of cobalt and therefore have potential use as a high temperature energy source (Raab, "Cobalt-60 as a Thermionic Fuel for Multi-kilowatt Applications," Advances in Energy Conversion Engineering, 1967, Intersociety Energy Conversion Engineering Conference, August 1967, Miami Beach, Fla., 543–552, Am. Soc. of Mech. Engineers, New York, 1967). However, attempts to prepare a high melting point cobalt-rhenium alloy are complicated in that cobalt boils at atmospheric pressure at a temperature (2900° C.) lower than the melting point of rhenium (3167° C.). Powder metallurgical methods could be used to blend cobalt powder with rhenium powder followed by heating and pressing at temperatures above the melting point of cobalt to fuse the molten cobalt into the hot metal particles. However, containment and handling of powdered radioactive cobalt-60 is difficult and hazardous. Irradiation can not be performed after preparation of the alloy because neutron radiation will convert the rhenium to osmium and thereby lower the melting point of the alloy. Moreover, neutron capture by rhenium decreases the neutron flux available for converting cobalt to a radioactive form.

SUMMARY OF THE INVENTION

Therefore, in view of the above limitation of the prior art it is an object of the present invention to provide a method for preparing a cobalt energy source for use at a temperature above the melting point of cobalt metal.

It is a further object to provide a method for preparing a high temperature cobalt-rhenium energy source with minimum handling of radioactive cobalt powder or liquid.

It is also an object to provide an energy source prepared by the method of the present invention.

In accordance with the present invention a cobalt-rhenium alloy for use as an energy source is formed by fusing together alternate layers of porous rhenium and irradiated cobalt metal. Each rhenium layer is formed by pressing a mass of rhenium powder to a predetermined porosity for absorbing a desired amount of molten cobalt. Each cobalt layer consists of a cobalt metal plate. The alternate layers are heated above the melting point of cobalt while pressing the layers inwardly together to infuse the cobalt into the porous rhenium and to form an alloy of cobalt and rhenium having a solidus temperature exceeding the melting point of cobalt metal.

DETAILED DESCRIPTION OF THE PREFERRED EMBODIMENT

Cobalt buttons or small plates prepared by any convenient method, such as by die punching from large cobalt metal sheets or slicing from cobalt ingots, are irradiated with neutrons to form a radioactive cobalt isotope. For instance, cobalt-59 is irradiated with neutrons to form cobalt-60. The power output or power density of the cobalt is determined by the amount of cobalt converted to the radioactive isotopic form. Although isotopic mixtures of cobalt-59 and cobalt-60 have been prepared with an activity as high as about 700 curies per gram, it has been convenient to provide isotopic mixtures having a radiation level of only up to about 400 curies per gram.

Cobalt-rhenium alloys having solidus temperatures in excess of about 1600° C. can be prepared by combining about one or more parts by weight of rhenium with about by weight rhenium do not have solidus temperatures appreciably above the melting point of cobalt (1495° C.). Since the rhenium metal is not radio-active, it dilutes the power output from the cobalt. Therefore, it is desirable in each particular application to select an optimum proportion of rhenium to cobalt which has a sufficiently high solidus temperature as well as an adequate power density. For example, a particular thermionic device can be effectively driven with a cobalt-rhenium alloy heat source having about 80 to 85 weight percent rhenium and about 15 to 20 weight percent cobalt irradiated to about a 400 curies per gram activity. Such a heat source would provide a power density of about 15 watts per cubic centimeter and the alloy would have a solidus temperature of about 2100° C. to 2300° C. Other cobalt rhenium alloys can be prepared with solidus temperatures up to about 3100° C. near the melting point of rhenium (3167° C.) by reducing the cobalt concentration, but a correspondingly lower power density will result.

Figure 1:
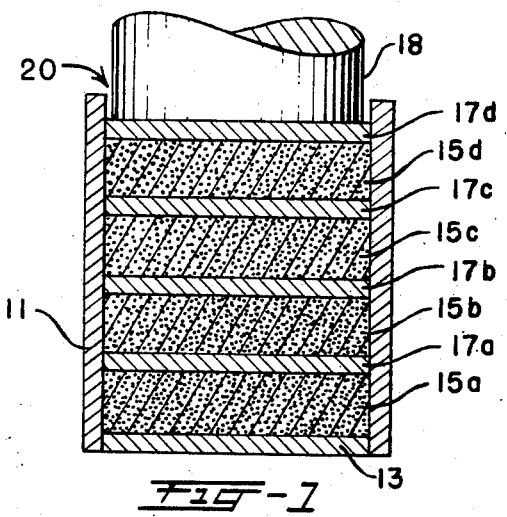
FIG. 1 is an elevation view in cross-section of alternate cobalt-rhenium layers loaded into a capsule in the preparation of the energy source of the present invention.

Referring now to the drawings, FIG 1 shows a capsule or elongated annular member 11 having a bottom 13 welded or affixed to close one end of member 11. The capsule is composed of rhenium metal or other material suitable for use at high temperatures in contact with molten cobalt. Alternate layers of porous rhenium compacts 15a–15d and radioactve cobalt metal plates 17a–17d are stacked into capsule 11. Merely by way of example, 4 to 10 layers of about 0.03 inch thick cobalt metal and of about 0.06 inch thick rhenium are stacked in an about 0.5 inch diameter capsule.

The porous rhenium compacts are prepared by prepressing powdered rhenium in a suitable die to provide compacts shaped to readily fit into the opening of capsule 11. The rhenium is in powdered form to minimize the cobalt diffusion distance into the rhenium particles as compared to that into the capsule walls. For example, less than about 200 mesh U.S. sieve series powder can be used. If desired, heat or a vaporizable binder material or wax may be employed to insure integral rhenium compacts. The rhenium powder is sufficiently compacted to eliminate large voids or pockets which could ultimately result in regions of high cobalt concentration having low solidus temperatures and high power output. Conversely, over compaction may result in insufficient rate of cobalt infusion in the subsequent hot pressing operation. It has been found that suitable rhenium compacts have been prepared by pressing at about 5000 to 20,000 p.s.i. to achieve a porosity of about 30% to 50% of theoretical density.

If desired, the rhenium compacts 15a–15d may be formed within capsule 11 rather than by prepressing as described. Alternate layers of powdered rhenium and cobalt plates are disposed into capsule 11 and pressed together at about 5000 p.s.i. with a suitable pressing device 18 to form the rhenium layers of desired porosity. Radioactive cobalt having a higher power density would begin to melt at this point in the operation and therefore the following hot pressing step would be immediately initiated.

After forming the cobalt-rhenium stack, the heat provided by the radioactive cobalt is supplemented if necessary to melt the cobalt plates and to selectively infuse the cobalt into the porous rhenium layers without substantial molten cobalt attack on the capsule walls. Pressure is simultaneously applied by the pressing device 18 to fill voids vacated by the infused cobalt. A temperature in excess of the melting point of cobalt, such as about 1600° C., and a pressure below or equal to that previously used to press the rhenium powder is employed. Excessive pressure is to be avoided as it tends to diminish the porosity of the rhenium layers prior to the cobalt melting and thereby impede cobalt infusion into the porous rhenium layers.

Alternatively, the filled capsule can be loosely sealed to provide adequate venting and heated for about 18 hours at about 1600° C. without accompanying pressure while the cobalt infuses into the porous rhenium layers. This procedure tends to leave voids previously occupied by the cobalt intermediate the rhenium layers and consequently diminishes power density.

To prevent molten cobalt attack or diffusion through the capsule walls, it is desirable to maximize the cobalt infusion rate into the porous rhenium layers. The cobalt solidifies on infusion into the rhenium to form a high melting point alloy and thereby becomes less reactive. A sufficiently high infusion rate into the rhenium can be obtained if sufficiently porous rhenium layers are provided and if a vent is provided to allow escape of gases or the vaporized binder material occupying the rhenium layer pores. For example, an opening or gap 20 is provided between pressing device 18 and capsule 11. Venting is enhanced by performing the heating and cobalt infusion in a vacuum environment.

Figure 2:
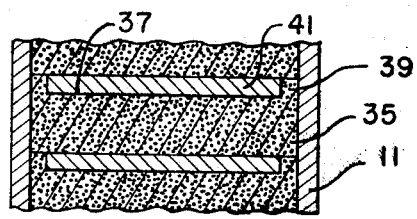
FIG. 2 is a fragmentary view in cross section of an alternate embodiment of the present invention.

Further protection for the capsule walls is provided by the alternate embodiment shown in FIG. 2. Porous rhenium layers 35 are formed with a recessed surface 37 encompassed by raised marginal portions 39. Radio-active cobalt metal plates 41 are cut to fit inside the raised portions 39 as shown. The porous rhenium layers 35 are prepared by the methods previously described. For instance, the rhenium powder may be prepressed in a suitably shaped die. Alternatively, the rhenium powder can be compacted within capsule 11 with the cobalt metal plates 41 in place between layers of rhenium powder to form recessed surfaces 37. The raised marginal portions 39 are formed by pressing the stack of alternate layers to extrude the rhenium powder between the edges of cobalt plates 41 and the walls of capsule 11. When the cobalt metal melts it will contact marginal portions 39 of the porous rhenium compacts and tend to form a solid non-reactive alloy therewith for shielding the walls of capsule 11.

Figure 3:
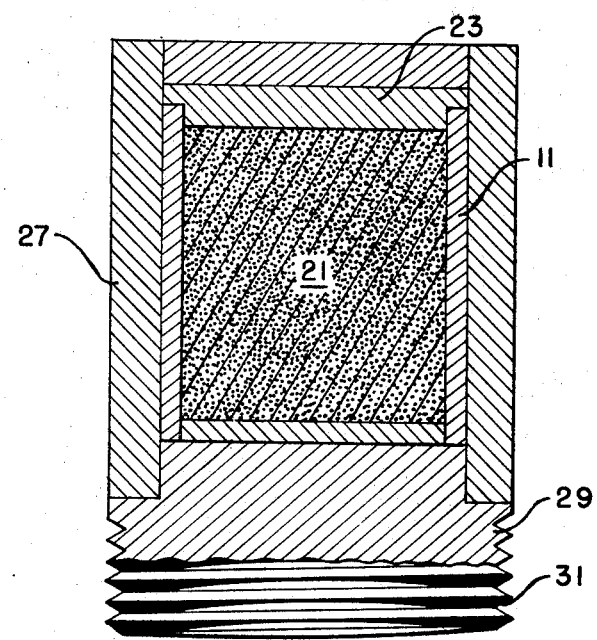
FIG. 3 is one embodiment of an energy source prepared by the method of the present invention.

A completed cobalt-rhenium energy source is shown in FIG. 3. An integral mass 21 of rhenium infused with radioactive cobalt is formed within capsule 11 as a result of the hot pressing operation described hereinabove. Capsule 11 is cut to a suitable length and an end cap 23 affixed to seal the radioactive mass 21 therein. The loaded capsule is further sealed in a second capsule or container 27 having a closure 29 attached to further insure against leakage of radioactive material. Closure 29 or another part of the outer capsule 27 may include a threaded portion 31 or other means for connecting the energy source to a utilization device. It should be clear that sufficient gamma ray absorbing material can be provided in the integral mass 21 and in the capsules 11 and 27 to effectively convert the radiation from the cobalt radioisotope to heat.

Although this invention is described in detail with reference to its preferred embodiment it is contemplated that obvious modifications will occur to those skilled in the art and that such may be made without departing from the scope of this invention which is limited only as indicated by the appended claims.

What is claimed is:
1. A method of preparing a high temperature energy source comprising:
   (a) loading alternate layers of porous rhenium compacts and radioactive cobalt plates into a capsule,
   (b) heating the loaded capsule to a temperature above the melting point of said cobalt for a sufficient time to selectively infuse molten cobalt into said porous rhenium layers without substantial infusion into said capsule, and
   (c) sealing said capsule.
2. The method according to claim 1 wherein said heating is performed while simultaneously hot pressing said alternate layers together to fill voids originally occupied by said radioactive cobalt.
3. The method according to claim 1 wherein said radioactive cobalt and rhenium are loaded into said capsule at a proportion of about 80% to 85% rhenium by weight and about 15% to 20% cobalt by weight.

4. The method according to claim 1 wherein said rhenium compacts are formed by pressing at a pressure of between about 5000 p.s.i. to about 20,000 p.s.i. to achieve a porosity of about 30 to 50 percent of theoretical density.

5. The method according to claim 4 wherein said rhenium is prepressed prior to loading said capsule to form compacts having marginal portions extending beyond a recessed surface for receiving said cobalt plates.

6. The method according to claim 1 wherein said loading comprises disposing alternate layers of powdered rhenium and cobalt plate into said capsule, said plates being of smaller diameter than the opening into said capsule, and pressing said alternate layers together to compact said rhenium powder and extrude a portion of said powder between said cobalt plates and the internal surfaces of said capsule.

7. A cobalt-rhenium energy source comprising a major proportion by weight of porous rhenium metal and a minor proportion by weight of cobalt metal, said cobalt metal being dispersed throughout said porous rhenium metal to form a solid integral mass.

8. The energy source of claim 7 wherein said cobalt-rhenium mass is enclosed in a rhenium capsule and has a solidus temperature in the range from about 1600° C. to about 3100° C.

References Cited

UNITED STATES PATENTS 3,421,001   1/1969   Fitzgerald.

WALTER STOLWEIN, Primary Examiner

M. J. FROME, Assistant Examiner

U.S. Cl. X.R.

3—1; 128—419; 250—84; 252—301.1